(12) United States Patent
Parkin

(10) Patent No.: US 8,387,746 B2
(45) Date of Patent: Mar. 5, 2013

(54) SYSTEMS AND METHODS FOR THE REDUCTION OF UNDERWATER ACOUSTICAL NOISE

(76) Inventor: John Parkin, Vancouver, WA (US)

(*) Notice: Subject to any disclaimer, the term of this patent is extended or adjusted under 35 U.S.C. 154(b) by 0 days.

(21) Appl. No.: 13/117,642

(22) Filed: May 27, 2011

(65) Prior Publication Data

US 2012/0298442 A1 Nov. 29, 2012

(51) Int. Cl.
*E02B 3/04* (2006.01)
(52) U.S. Cl. .......................... 181/290; 405/227
(58) Field of Classification Search .......... 405/227, 405/228; 181/198, 290
See application file for complete search history.

(56) References Cited

U.S. PATENT DOCUMENTS

| | | | |
|---|---|---|---|
| 357,019 A | 2/1887 | Merrel et al. | |
| 3,011,316 A * | 12/1961 | Wilson | 405/28 |
| 3,487,645 A * | 1/1970 | Frankel | 405/26 |
| 4,949,317 A | 8/1990 | Mc Quitty et al. | |
| 5,266,245 A | 11/1993 | Wellings et al. | |
| 5,795,099 A * | 8/1998 | Parker | 405/28 |
| 5,879,105 A * | 3/1999 | Bishop et al. | 405/26 |
| 6,530,337 B1 * | 3/2003 | Hoffman | 114/361 |
| 7,476,056 B2 * | 1/2009 | Dreyer | 405/228 |
| 7,524,140 B2 * | 4/2009 | Bishop | 405/30 |
| 7,572,083 B1 * | 8/2009 | Bishop et al. | 405/26 |
| 7,686,539 B2 * | 3/2010 | Aristaghes et al. | 405/28 |
| 2011/0031062 A1 * | 2/2011 | Elmer | 181/175 |
| 2011/0299938 A1 * | 12/2011 | Jung et al. | 405/228 |

* cited by examiner

*Primary Examiner* — Jeremy Luks
(74) *Attorney, Agent, or Firm* — J. Curtis Edmondson

(57) ABSTRACT

The inventive subject matter describes systems and methods for the implementation of an aquatic acoustical barrier, the aquatic acoustical barrier having a multiplicity of acoustical layers, the acoustical layers further having a multiplicity of acoustical leafs, such that when the acoustical barrier surrounds a noise source in the water there is an attenuation created by the noise source.

12 Claims, 5 Drawing Sheets

SYSTEMS AND METHODS FOR THE REDUCTION OF UNDERWATER ACOUSTICAL NOISE

RELATED APPLICATIONS

This application claims the benefit of U.S. provisional application No. 61/333,559, filed on May 3, 2010, the contents herein incorporated into this application by reference.

BACKGROUND

The present inventive subject matter relates to the systems and methods Systems and Methods for the Reduction of Underwater Acoustical Noise The protection and preservation of natural resources includes the management of fish and game. Fish move about lakes, rivers, streams and reservoirs for a variety of reasons, including migration, spawning, and searching for food. Furthermore, some fish species have such small populations that they are protected either under State or Federal laws (e.g. the endangered species act).

During the construction of roads it is sometimes necessary to drive pilings or other support structures into lakes, streams, and/or marshes. The driving of these pilings or other structures into the water creates acoustical vibrations. These vibrations can be of sufficient power to either injure or kill fish or other aquatic animals that are in the proximity to the vibrations. The issue of effect of sound underwater, known as bioacoustics, is of sufficient concern that the California Department of Transportation (Caltrans), the departments of transportation for Oregon and Washington, and the Federal Highways Administration have formed groups to study the impact on fisheries due to in-water pile driving.

Prior art acoustical mitigation devices include air bubble curtains, cofferdams, isolation casings, and cushion blocks. Air bubble curtains employ a bubble screen to reduce sound pressure. The drawbacks for bubble screens are the limited reduction in acoustical pressure. Cofferdams have greater acoustical reduction, but, are expensive to install and remove. Isolation casings have the drawback of less attenuation than cofferdams. Lastly, cushion blocks are placed in-between the hammer and the pile (in the case of pile driving). Cushion blocks likewise have limited attenuation properties as compare to cofferdams.

Therefore, there is a need to have a aquatic acoustical barrier proximate to underwater construction in general and near pile driving in particular. This barrier should have low cost, use readily available materials, and be easy to install and extract, and provide limited damage to the water environment.

SUMMARY

The present inventive subject matter overcomes problems in the prior art by providing for systems and methods of an aquatic acoustical barrier, the aquatic acoustical barrier having a multiplicity of acoustical layers, the acoustical layers further having a multiplicity of acoustical leafs, such that when the acoustical barrier surrounds a noise source in the water there is an attenuation created by the noise source. The aquatic acoustical barrier also has the acoustical leaves closely touching or overlapping. The aquatic acoustical barrier also has an acoustical layer that is contiguous or semi-contiguous. The aquatic acoustical barrier also having said acoustical leafs which have a leaf connector, a leaf closure, and a leaf container. The aquatic acoustical barrier also having a leaf connector that consists of bolts, screws, or hooks and/or a pair of parallel plates. The aquatic acoustical barrier where the parallel plates are screwed together so that the parallel plates form a seal on the leaf container. The aquatic acoustical barrier where the leaf closure is constructed from a pair of parallel plates and the parallel plates are be sealed by spaced latches. The aquatic acoustical barrier wherein the leaf container is made from natural fiber fabrics, plastics, reinforced paper, metals, laminates, or any combination thereof. The aquatic acoustical barrier where the leaf container is constructed from a permeable bag. The aquatic acoustical barrier where the leaf container is constructed from a watertight bag. The aquatic acoustical barrier where the leaf container is filled with a hydro acoustic absorbing material. The aquatic acoustical barrier where the leaf container is filled with sand. The aquatic acoustical barrier where the leaf container is filled with lava aggregate. The aquatic acoustical barrier where the leaf container is filled with materials selected from a group comprising polystyrene foam balls, and small rubber balls. The aquatic acoustical barrier where each successive acoustical layer are slightly larger in size to form a "cone shaped" structure.

A method for the reduction of acoustical noise of pile driving having the steps of surrounding a pile by an aquatic acoustical barrier, said aquatic acoustical barrier further having a multiplicity of acoustical layers, the acoustical layers further having a multiplicity of acoustical leafs, such that when the pile driver is in use the noise source is attenuated. The method where the reduction of acoustical noise includes the steps of using an acoustical absorbing material in the acoustical leaf.

The foregoing is not intended to be an exhaustive list of embodiments and features of the present inventive subject matter. Persons skilled in the art are capable of appreciating other embodiments and features from the following detailed description in conjunction with the drawings.

REFERENCE CHARACTERS

Figure 1:
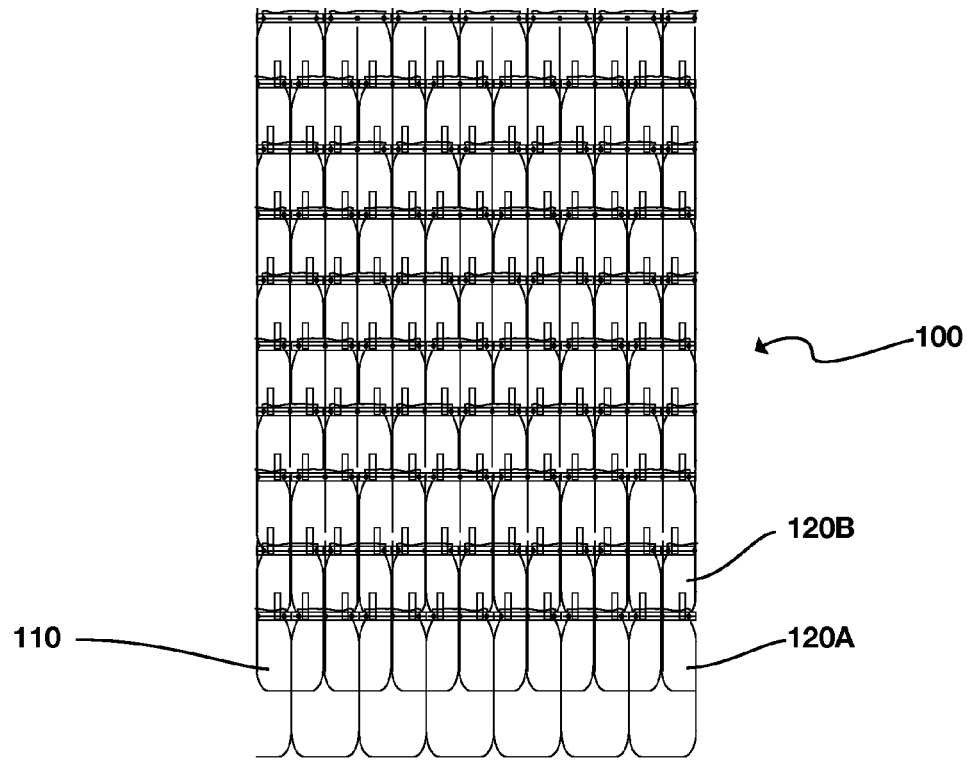
FIG. 1 is a front view of the inventive subject matter.

100—Aquatic Acoustical Barrier
110—Acoustical Leaf
120—Acoustical Layer
210—Leaf Connector
220—Leaf Closure
230—Leaf Container
310—Layer Support
320—Layer Guide
330—Inner Layer Support
410—Pile
420—Pile Driver
430—Unattenuated Aquatic Acoustical Noise
440—Attenuated Aquatic Acoustical Noise
450—Injured Fish
460—Non Injured Fish
510—Lifting Bracket
520—Lifting Connector

DETAILED DESCRIPTION

Representative embodiments according to the inventive subject matter are shown in FIGS. 1-5, wherein similar features share common reference numerals.

FIG. 1 depicts a front view of the aquatic acoustical barrier 100. The aquatic acoustical barrier 100. The aquatic acoustical barrier 100 has an external surface and an internal surface, where an object that is desired to be protected is placed on one side of the aquatic acoustical barrier 100 from the noise source that is located on the other side.

The aquatic acoustical barrier 100 is composed of a series of closely touching or overlapping acoustical leafs 110. As shown, the acoustical leafs 110 are positioned proximate to each other, and designed to form a contiguous and/or semi-contiguous structure, an acoustical layer 120. The acoustical layer 120 is configured so that multiple acoustical layers may be "stacked" such that varying vertical heights can be constructed.

Figure 2:
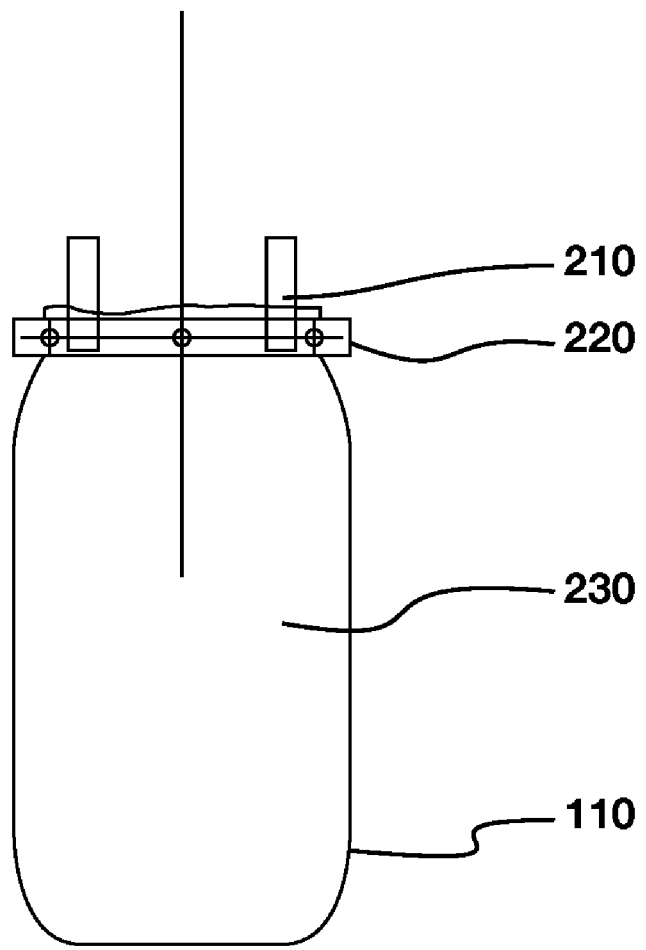
FIG. 2 is a close of view of the acoustical leaf.

FIG. 2 depicts a front view of the acoustical leaf 110. The acoustical leaf 110 is composed of a leaf connector 210, a leaf closure 220, and a leaf container 230. The leaf connector 210 may be made from any type of connecting materials, such as, bolts, screws, hooks, etc. The leaf closure 220 may be constructed from pair of parallel plates that are screwed together that forms a seal on the leaf container 230. Alternately, the leaf closure 220 may be sealed by spaced latches such that material placed into the leaf container 230 does not escape. The leaf container 230 can be constructed from a permeable and watertight bag made out of such materials as natural fiber fabrics, plastics, reinforced paper, metals, laminates, or any combination thereof.

The leaf container 230 is design to accommodate materials that attenuate underwater noise. Furthermore, the materials should be of a substance that does not readily leach into the water. Such materials could be sand, aggregates, polystyrene foam balls, small rubber balls, etc. or any combination thereof.

Figure 3:
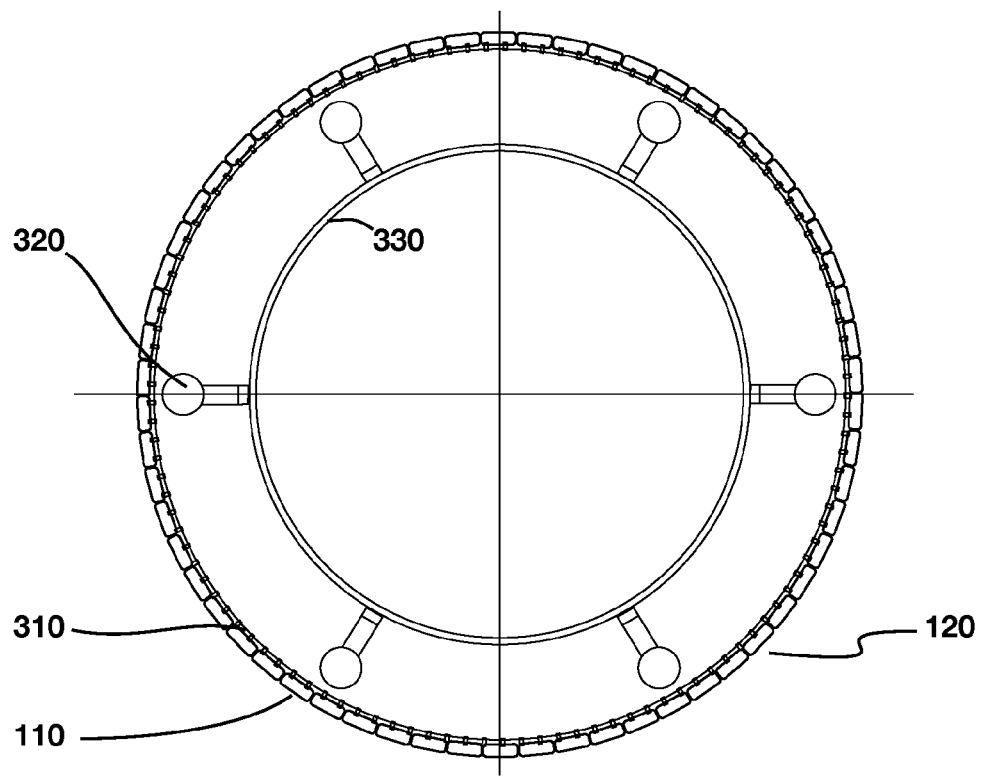
FIG. 3 is a top view of the inventive subject matter.

FIG. 3 demonstrates one embodiment of the layer support 310. The acoustical leafs 110 are attached to the layer support 310 to form the acoustical layer 120. The acoustical layers 120 can be contiguous in nature and/or semicontiguous. The acoustical layers 120 can be stacked on each other. Furthermore, it is not necessary that each acoustical layer be identical, for example, each successive acoustical layer 120 may be slightly larger, to form a "cone shaped" structure.

Internal to the layer support 310 may be layer guides 320 to provide additional support to the layer support 310 and to provide alignment. Furthermore, an inner layer support 330 may be added to provide additional support.

Multiple layer supports 310, can be constructed such that each support 310 surrounds the other. For example, the first multiple layer support 310 may be positioned to 1 meter from the piling, and a second layer support may be positioned 1 meter outwards from the first layer support.

Figure 4:
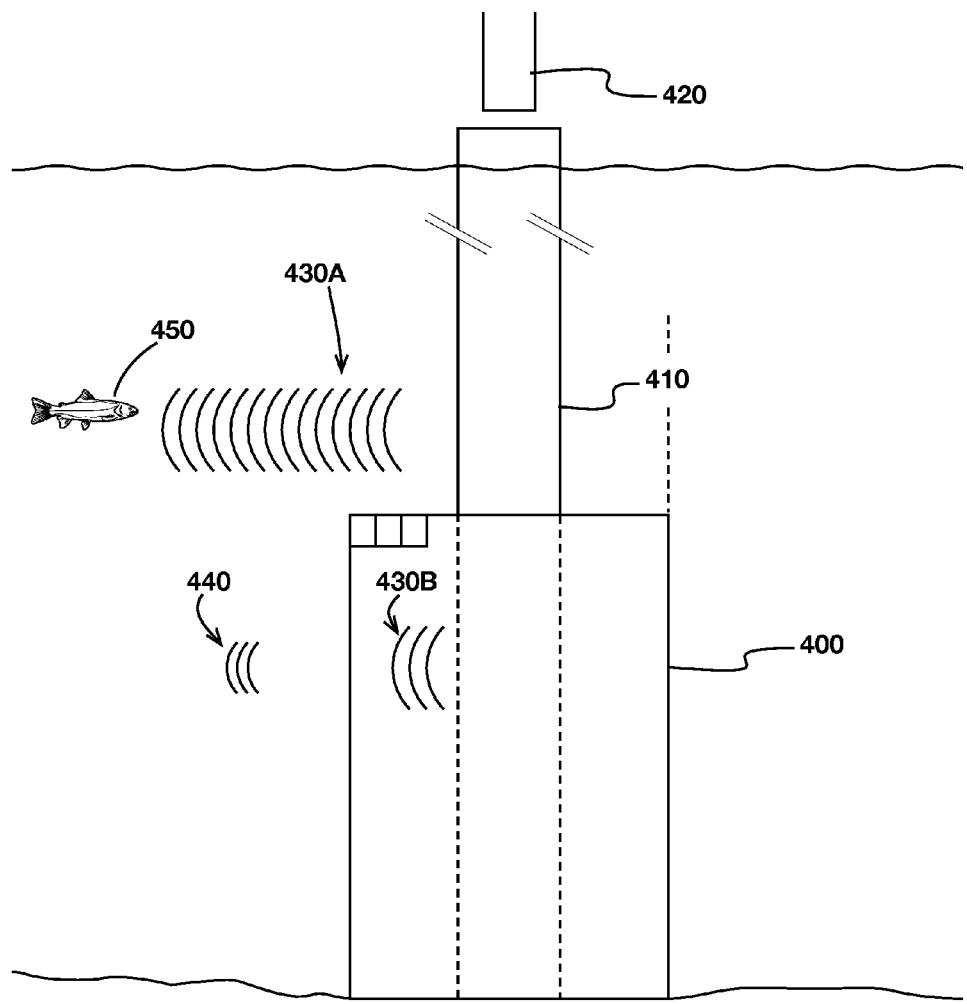
FIG. 4 is a side view of the use of the inventive subject matter during the process of reducing acoustical noise.

FIG. 4 depicts the inventive subject matter in actual use. The aquatic acoustical barrier 100 surrounds a pile 410 and a pile driver 420. The use of the pile driver 420 results in unattenuated aquatic acoustical noise 430A where the pile 410 is not surrounded and attenuated aquatic acoustical noise 430B where the pile driver 420 is surrounded by the acoustical barrier 100.

Figure 5:
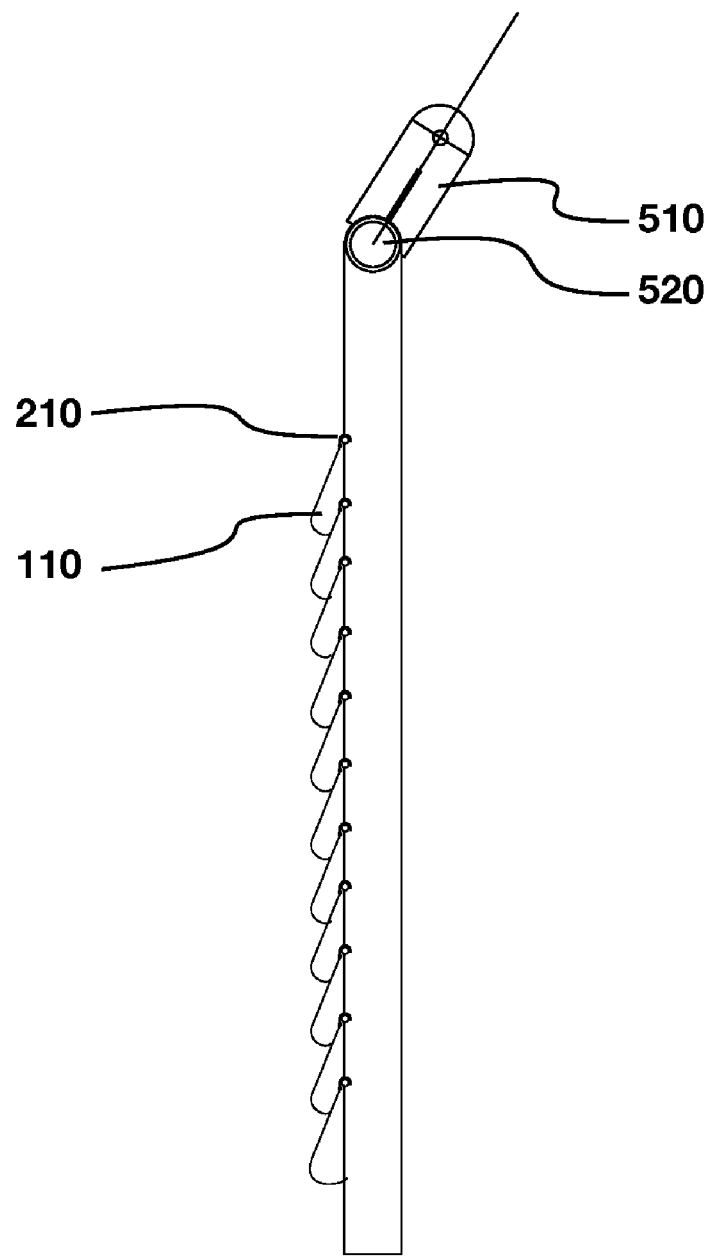
FIG. 5 is a side view of a support bracket used to support the layer

FIG. 5 depicts a possible lifting support mechanism. A lifting bracket 510 is connected to a lifting connector 520 which is then connected to the acoustical barrier.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

I claim:

1. An aquatic acoustical barrier comprising:
   a multiplicity of acoustical layers, wherein each acoustical layer further comprises a multiplicity of acoustical leafs, thereby creating an aquatic acoustical barrier;
   wherein each acoustical leaf comprises:
   a leaf connector,
   a leaf closure,
   and a leaf container.

2. The aquatic acoustical barrier as described in claim 1 wherein said leaf connector is selected from a group consisting of bolts, screws, or hooks.

3. The aquatic acoustical barrier as described in claim 1 wherein said leaf closure is constructed from a pair of parallel plates.

4. The aquatic acoustical barrier as described in claim 3 wherein said parallel plates are screwed together, such that the parallel plates form a seal on the leaf container.

5. The aquatic acoustical barrier as described in claim 1 wherein said leaf closure is constructed from pair of parallel plates wherein said parallel plates are be sealed by spaced latches.

6. The aquatic acoustical barrier as described in claim 1 wherein said leaf container is selected from a group consisting of natural fiber fabrics, plastics, reinforced paper, metals, laminates, or any combination thereof.

7. The aquatic acoustical barrier as described in claim 1 wherein said leaf container is constructed from a permeable bag.

8. The aquatic acoustical barrier as described in claim 1 wherein said leaf container is constructed from a watertight bag.

9. The aquatic acoustical barrier as described in claim 1 wherein said leaf container is filled with a hydro acoustic absorbing material.

10. The aquatic acoustical barrier as described in claim 1 wherein said leaf container is filled with sand.

11. The aquatic acoustical barrier as described in claim 1 wherein said leaf container is filled with lava aggregate.

12. The aquatic acoustical barrier as described in claim 1 wherein said leaf container is filled with materials selected from a group comprising polystyrene foam balls, and small rubber balls.

* * * * *